United States Patent
Nickey et al.

(10) Patent No.: US 6,742,361 B1
(45) Date of Patent: Jun. 1, 2004

(54) APPARATUS FOR PRODUCING A COOLING OR LUBRICATING SPRAY

(75) Inventors: George A. Nickey, Maumee, OH (US); John M. Slifco, Toledo, OH (US)

(73) Assignee: Owens-Brockway Glass Container Inc., Toledo, OH (US)

( * ) Notice: Subject to any disclaimer, the term of this patent is extended or adjusted under 35 U.S.C. 154(b) by 298 days.

(21) Appl. No.: 09/968,383

(22) Filed: Oct. 1, 2001

(51) Int. Cl.$^7$ .................................................. C03B 7/14
(52) U.S. Cl. ..................... 65/303; 174/334; 174/133; 174/332; 174/356; 239/311; 239/328; 83/16; 83/640
(58) Field of Search ................... 65/303, 174, 334, 65/133, 332, 356, 170, 26; 239/311, 328, 428; 83/16, 640, 641

(56) References Cited

U.S. PATENT DOCUMENTS

| | | |
|---|---|---|
| 2,063,849 A | 12/1936 | Peiler et al. |
| 2,230,609 A | 2/1941 | Cannon, Jr. |
| 2,754,627 A | 7/1956 | Denman |
| 3,287,098 A | 11/1966 | Stutske et al. |
| 4,391,620 A | 7/1983 | Geisel |
| 4,409,014 A | 10/1983 | Taylor et al. |
| 4,944,207 A | 7/1990 | Nebelung et al. |
| 5,573,570 A | 11/1996 | Leidy et al. |

*Primary Examiner*—Peter Chin
*Assistant Examiner*—Mark Halpern

(57) ABSTRACT

An apparatus for delivering a spray of cooling liquid to opposed shear blades of an apparatus for shearing a stream of molten glass into gobs, the apparatus having liquid outlets (24, 26) that lead to spray nozzles. A liquid is intermittently delivered at a low pressure to the liquid outlets (24, 26) from separate liquid inlets (20, 22, respectively), each of the outlets (24, 26) having a solenoid valve (28, 30, respectively), in a line leading thereto. The nozzles that receive liquid from the outlets (24, 26) are periodically purged of accumulated coagulated coolant or other debris by pumping coolant therethrough at a substantially higher pressure. To this end, each of the liquid outlets (24, 26) is connected to an outlet from a rodless cylinder (32, 34, respectively), and high pressure air from a common inlet (36) is intermittently imposed on an inlet to each rodless cylinder (32, 34) to urge pistons in the rodless cylinders toward the outlets from the rodless cylinders (40, 42, respectively) to expel liquid coolant in the rodless cylinders (40, 42) toward the liquid outlets (24, 26, respectively) at a substantially higher pressure. A solenoid valve (50, 52) is positioned in the high pressure air inlets to the rodless cylinders (32, 34, respectively) to limit the pressurization of the liquid outlets (24, 26) on a timed basis so that nozzle clogging is eliminated.

8 Claims, 1 Drawing Sheet

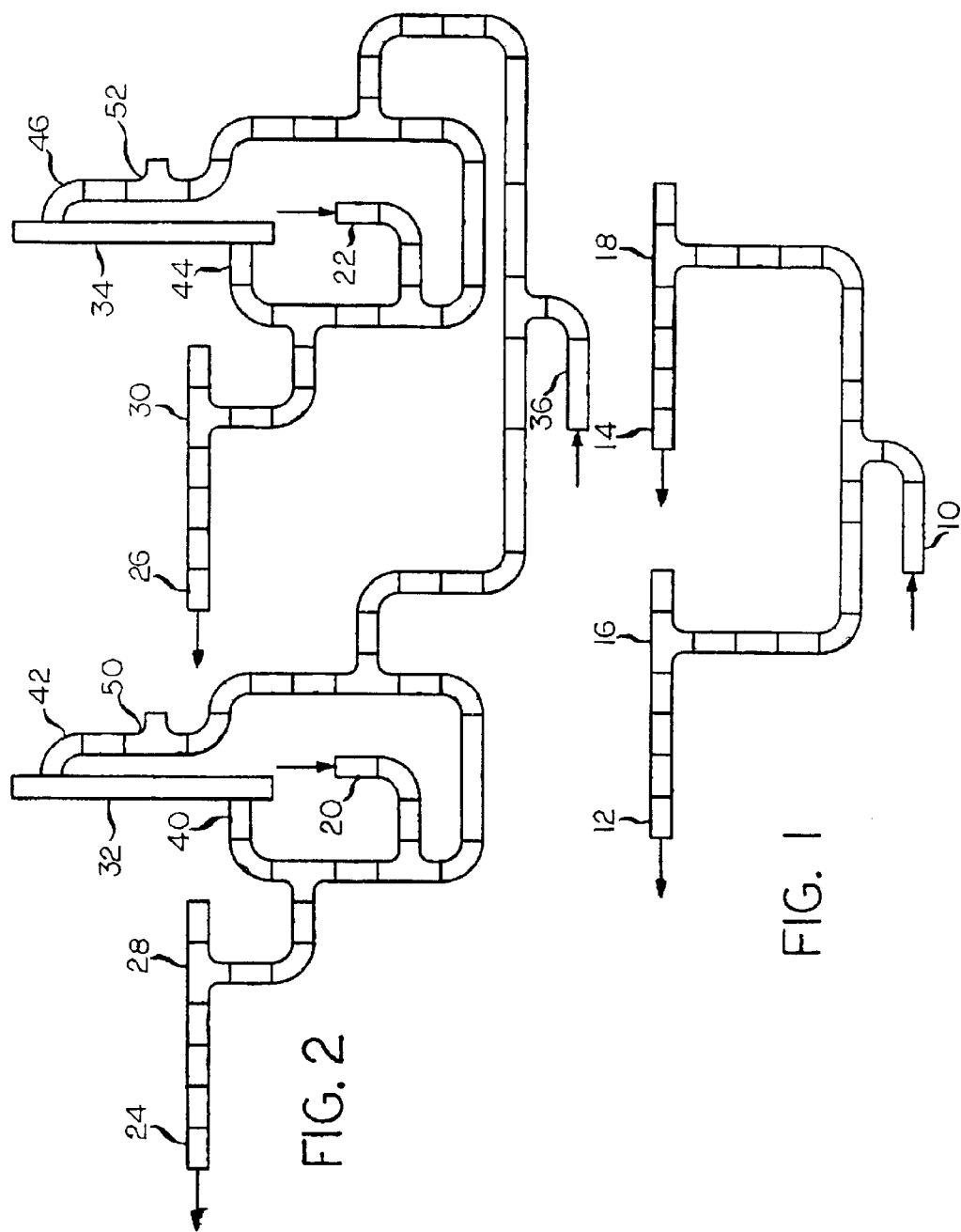

APPARATUS FOR PRODUCING A COOLING OR LUBRICATING SPRAY

FIELD OF THE INVENTION

This invention relates to an apparatus for producing a cooling or lubricating spray. More particularly, this invention relates to an apparatus of producing a cooling and lubricating spray for cooling and lubricating opposed, reversing shear blades of the type that are used to sever a stream of molten glass in a glass manufacturing installation to form a series of individual gobs from each such glass stream, each of the gobs being adapted to be formed into a hollow container or other useful article.

BACKGROUND OF THE INVENTION

U.S. Pat. No. 5,573,570 (Leidy, et al.), which is assigned to the assignee of this application, the disclosure of which is incorporated herein by reference, describes a shearing apparatus in which opposed sets of blades are periodically brought into and out of contact with one another to shear a stream of molten glass that passes between each of an opposed pair of blades in each set into individual gobs for further processing. The blades of the aforesaid '570 patent move along parallel, rectilinear paths, which is the preferred arrangement for modern glass container forming machines of the individual section (I.S.) type when they are used to simultaneously form three or four glass containers at each machine section. It is also known, for example, from U.S. Pat. No. 2,754,627 (Denman), the disclosure of which is also incorporated by reference herein, that opposed glass shear blades can be swung along arcs into and out of shearing engagement with one another.

It is also known, for example, from the aforesaid '627 patent that it is desirable to spray the shear blades of the glass shear apparatus to cool and lubricate such shear blades. U.S. Pat. No. 4,409,014 (Taylor, et al.), the disclosure of which is also incorporated by reference herein, discloses a specific apparatus for producing an oil-water mixture for use in spraying the blades of a glass stream shearing apparatus that is used to shear each of one or more streams of glass into a series of individual gobs. The shearing of a glass stream into gobs by an opposed pair of blades that are periodically brought into and out of contact with one another is also disclosed in U.S. Pat. No. 4,391,620 (Geisel).

As is recognized in the prior art, the coolant that is applied to the exterior of glass shear blades is often done as a spray through spraying nozzles or spray heads. This is disclosed, for example, in the aforesaid '014 and '620 patents. A problem exists with respect to certain prior art glass shear blade cooling Installations, however, in that the spray nozzles, which have very small diameter coolant flow passages, tend to clog with coagulated coolant over an extended period of time. To overcome this problem, such installations are often operated at higher than required coolant pressure, which leads to coolant flow rates that are higher than required for proper blade cooling and lubrication. It is towards a solution to the glass shear blade coolant nozzle clogging problem, to thereby permit a reduction in coolant pressure and flow rates, that the present Invention is directed.

SUMMARY OF THE INVENTION

The aforesaid and other problems associated with prior art molten glass shear blade coolant Installations are overcome by the present invention in which the coolant is normally sprayed through spray nozzles at a first, lower pressure, which only need be sufficient to deliver a satisfactory spray volume when it can be assumed that the nozzles are operating in an unclogged or substantially unclogged condition. Periodically, however, the nozzles are purged by temporarily increasing the pressure of the coolant that is sprayed therethrough. This is done by intermittently operating a rodless pneumatic cylinder in which one side of a free piston in a cylinder is intermittently exposed to high pressure air and the other side of the piston is exposed to shear blade coolant.

Accordingly, it is an object of the current invention to provide an improved apparatus for providing a cooling or lubricating spray to spray contacting surfaces of an opposed pair of shear blades that are periodically brought into and out of contact with one another. More particularly, it is an object of the present invention to provide an improved apparatus of the aforesaid character that is well suited for spraying an opposed pair of shear blades in shearing apparatus that is used to periodically sever a stream of molten glass into a series of individual gobs of molten glass.

BRIEF DESCRIPTION OF THE DRAWING

FIG. 1 is a schematic view of a piping diagram for supplying compressed air at a lower pressure to opposed shear blades for purposes of atomizing fluid that is also delivered to be atomized for delivery to the opposed sets of shear blades; and FIG. 2 is a schematic view of a piping diagram for delivering fluid to be atomized for application to the opposed sets of shear blades and for periodically increasing the pressure of the fluid passing through the nozzle.

DETAILED DESCRIPTION OF THE PREFERRED EMBODIMENT

As is shown in FIG. 1, low pressure air is delivered from a common air inlet 10 to each of a pair of air outlets 12, 14 for delivering a coolant spray to an opposed pair of nozzles or sets of nozzles of an installation for shearing a stream of molten glass into a series of individual gobs. The outlets 12, 14 have solenoid valves 16, 18, respectively, in the lines leading thereto to permit the opposed spray nozzles to be operated only when required.

The coolant delivery system of FIG. 2 has a pair of coolant inlets 20, 22 for delivering coolant to the nozzles that receive low pressure air from the outlets 12, 14, respectively, through coolant outlets 24, 26, respectively. The outlets 24, 26 have solenoid valves 28, 30, respectively, in the lines leading thereto to permit coolant to be delivered to and through the opposed spray nozzles only when required. Coolant from each of the coolant inlets 20, 22 is also delivered to an end of a rodless cylinder 32, 34, respectively, to be accumulated therein for eventual distribution to the coolant outlets 24, 26, respectively, at a higher than normal pressure.

Air at a substantially higher pressure than the air delivered to the inlet 10 of FIG. 1 is delivered to an air inlet 36 in the arrangement of FIG. 2, and such pressurized air is delivered to opposed ends of each of the cylinders 32, 34 through an air outlet 42, in the case of the cylinder 32, and through an air outlet 46, in the case of the cylinder 34. The air outlet 42 to the cylinder 32 has a solenoid 50 in a line leading thereto to permit a piston in the cylinder 32 to be pressurized on its high pressure air inlet side only when required; likewise the air outlet 46 to the cylinder 34 has a solenoid valve 52 in a line leading thereto to permit a piston in the cylinder 34 to be pressurized on its high pressure air inlet side only when required.

During normal operations of a shear blade spray system according to FIGS. 1 and 2, solenoid valves 50 and 52 remain closed to flow, and solenoid valves 16, 18, 28 and 30 open and close to flow as required for proper cooling and lubrication of the shear blades of the installation. Thus, the pressure of the air from the outlets 12, 14 and the pressure of the coolant from the coolant outlets 24, 26, respectively, which are associated with such air outlets, need be no more than required for a proper flow of a coolant spray to the spray nozzles that receive coolant from the coolant outlet 24, 26. During this time, coolant accumulates in the cylinders 32, 34 on the side of the piston therein that faces the coolant outlets 40, 44, respectively, thereby driving such pistons towards the air outlets 42, 46 respectively. When it is desired to purge the spray nozzles associated with the coolant outlets 24, 26, the solenoid valves 50, 52 are opened, to thereby pressurize the cylinders 32, 34, respectively, on the sides of the pistons therein that face the air outlet 42, 46, respectively, which drives such pistons towards the coolant outlets 40, 44 respectively. This causes a temporary increase in the pressure of the coolant discharge through the coolant outlets 24, 26, and this pressure increase will purge the spray nozzles associated with the coolant outlets 24, 26 from any debris or coagulated coolant that may have accumulated therein.

In the operation of a system according to FIG. 1 or 2, it has been found that operation with the pressure to the air inlet 36 of approximately 50 p.s.i.g., assuming a pressure to the air inlet 10 of 5 p.s.i.g., will permit a reduction in coolant flow rate through the outlets 24, 26, in a typical installation, from a rate of at least 6 gallons per minute to a rate no more than 3 gallons per minute, or a reduction of at least 50 percent.

Although the best mode contemplated by the inventors for carrying out the present invention as of the filing date hereof has been shown and described herein, it will be apparent to those skilled in the art that suitable modifications, variations, and equivalents may be made without departing from the scope of the invention, such scope being limited solely by the terms of the following claims and the legal equivalent thereof.

We claim:

1. Apparatus for delivering a liquid to nozzles for spraying onto a surface, said apparatus comprising:
    means for intermittently delivering a liquid at a first pressure to the nozzles;
    means for intermittently delivering air at a second pressure to the nozzles; and,
    means for intermittently delivering the liquid to the nozzle at a third pressure, the third pressure being substantially higher than the first pressure and substantially higher than the second pressure;
    said means for intermittently delivering the liquid comprising a first solenoid valve;
    said means for intermittently delivering air at a second pressure to the nozzle comprising a second solenoid valve; and
    said means for intermittently delivering the liquid to the nozzles at a third pressure comprising;
        a rodless cylinder having a piston thereon;
        an air inlet into said rodless cylinder on a side of the piston therein, said air inlet into said rodless cylinder being intermittently in communication with air at a fourth pressure, the fourth pressure being substantially higher than the second pressure;
        a liquid inlet into said rodless cylinder on a side of the piston there that is opposed to the side away from said air inlet; and
        a third solenoid valve in communication with said air inlet to said rodless cylinder;
        said liquid inlet into said rodless cylinder being in fluid communication with said means for intermittently delivering liquid at a first pressure to the nozzles.
2. An apparatus according to claim 1 wherein said apparatus comprises apparatus for shearing a stream of molten glass into gobs, and said surface of said apparatus comprises a surface of a shear blade of said apparatus.
3. Apparatus according to claim 2 wherein:
    the first pressure and the second pressure are each approximately 5 p.s.i.g.; and
    the third pressure is approximately 50 p.s.i.g.
4. Apparatus for delivering a liquid to nozzles for spraying onto an opposed pair of surfaces, said apparatus comprising:
    means for intermittently delivering a liquid at a first pressure to first nozzles for spraying onto a first of said opposed surfaces;
    means for intermittently delivering a liquid at a first pressure to second nozzles for spraying onto the other of said opposed pair of surfaces;
    means for intermittently delivering air at a second pressure to said first nozzles;
    means for intermittently delivering air at the second pressure to the second nozzles;
    means for intermittently delivering a liquid to the first nozzles at a third pressure, the third pressure being substantially higher than the first pressure; and
    means for intermittently delivering a liquid to the second nozzles at a fourth pressure, the fourth pressure being substantially higher than the second pressure;
    wherein said means for intermittently delivering a liquid to the first nozzles comprises a first solenoid valve; and
    said means for intermittently delivering a liquid to the second nozzles comprises a second solenoid valve.
5. Apparatus according to claim 4 wherein:
    said means for intermittently delivering air to the first nozzles comprises a third solenoid valve; and
    said means for intermittently delivering air to the second nozzles comprises a fourth solenoid valve.
6. Apparatus according to claim 4 wherein said means for intermittently delivering the liquid to the first nozzles at the third pressure comprises:
    a first rodless cylinder having a piston therein;
    an air inlet into said first rodless cylinder on an opposite of the piston therein;
    a fifth solenoid valve in communication with said air inlet to said first rodless cylinder;
    said liquid inlet into said first rodless cylinder being in communication with said means for delivering liquid to said first set of nozzles;
    a second rodless cylinder having a piston therein;
    an air inlet into said second rodless cylinder on an opposite side of the piston therein;
    a sixth solenoid valve in communication with said air inlet to said second rodless cylinder; and
    said liquid inlet into said second rodless cylinder being in communication with said means for delivering a liquid to said second set of nozzles.
7. Apparatus according to claim 6 wherein:
    said apparatus comprises apparatus for shearing a stream of glass into gobs;
    one of said opposed pair of surfaces comprises surfaces of a first set of shear blades of said apparatus; and
    the other of said opposed pair of surfaces comprises surfaces of a second set of shear blades of said apparatus.
8. Apparatus according to claim 7 wherein:
    the first pressure and the second pressure are each approximately 5 p.s.i.g.; and
    the third pressure is approximately 50 p.s.i.g.

* * * * *